United States Patent
Sharma et al.

(10) Patent No.: US 9,674,373 B2
(45) Date of Patent: *Jun. 6, 2017

(54) IDENTIFICATION OF TIMESTAMPS FOR A PARTIAL CDR WHEN FAILOVER OCCURS IN AN OFFLINE CHARGING SYSTEM

(71) Applicant: Alcatel-Lucent USA Inc., Murray Hill, NJ (US)

(72) Inventors: Ranjan Sharma, New Albany, OH (US); Maryse Gardella, Velizy (FR)

(73) Assignee: Alcatel-Lucent, Boulogne-Billancourt (FR)

(*) Notice: Subject to any disclaimer, the term of this patent is extended or adjusted under 35 U.S.C. 154(b) by 0 days.

This patent is subject to a terminal disclaimer.

(21) Appl. No.: 14/605,714

(22) Filed: Jan. 26, 2015

(65) Prior Publication Data
US 2015/0133080 A1    May 14, 2015

Related U.S. Application Data

(62) Division of application No. 13/541,800, filed on Jul. 5, 2012, now Pat. No. 8,977,233.

(51) Int. Cl.
*H04M 11/00* (2006.01)
*H04M 15/00* (2006.01)
*H04L 12/14* (2006.01)
*H04L 12/24* (2006.01)

(52) U.S. Cl.
CPC .... *H04M 15/8228* (2013.01); *H04L 12/1403* (2013.01); *H04L 12/1428* (2013.01); *H04L 41/0668* (2013.01); *H04M 15/41* (2013.01); *H04M 15/43* (2013.01); *H04M 15/53* (2013.01); *H04M 15/57* (2013.01); *H04M 15/64* (2013.01);
(Continued)

(58) Field of Classification Search
None
See application file for complete search history.

(56) References Cited

U.S. PATENT DOCUMENTS

2004/0210522 A1* 10/2004 Bissantz ............... G06Q 20/10
                                                                  705/40
2008/0125082 A1*  5/2008 Salo .................... H04L 12/14
                                                                  455/406
(Continued)

*Primary Examiner* — Shantell L Heiber
(74) *Attorney, Agent, or Firm* — Duft Bornsen & Fettig, LLP

(57) ABSTRACT

Systems and methods that generate a partial Charging Data Record (CDR) when charging transfers from a primary charging function to a secondary charging function due to a failure. In one embodiment, the system receives an interim accounting request for a session from a secondary charging function after charging was transferred from the primary charging function. The system then opens a new partial CDR for the session based on the interim accounting request. The system receives a prior partial CDR for the session from the primary charging function, parses the prior partial CDR to identify a CDR timestamp, and records a start time in the new partial CDR based on the CDR timestamp. The system parses the interim accounting request to identify an accounting timestamp for the session, records an end time in the new partial CDR based on the accounting timestamp, and closes the new partial CDR.

18 Claims, 8 Drawing Sheets

(52) U.S. Cl.
CPC ........... *H04M 15/65* (2013.01); *H04M 15/70* (2013.01); *H04M 15/725* (2013.01); *H04M 15/74* (2013.01)

(56) References Cited

U.S. PATENT DOCUMENTS

2010/0257077 A1* 10/2010 Cai ...................... G06Q 30/04
                                                                          705/34
2010/0304710 A1* 12/2010 Sharma ................ H04M 15/00
                                                                          455/406

* cited by examiner

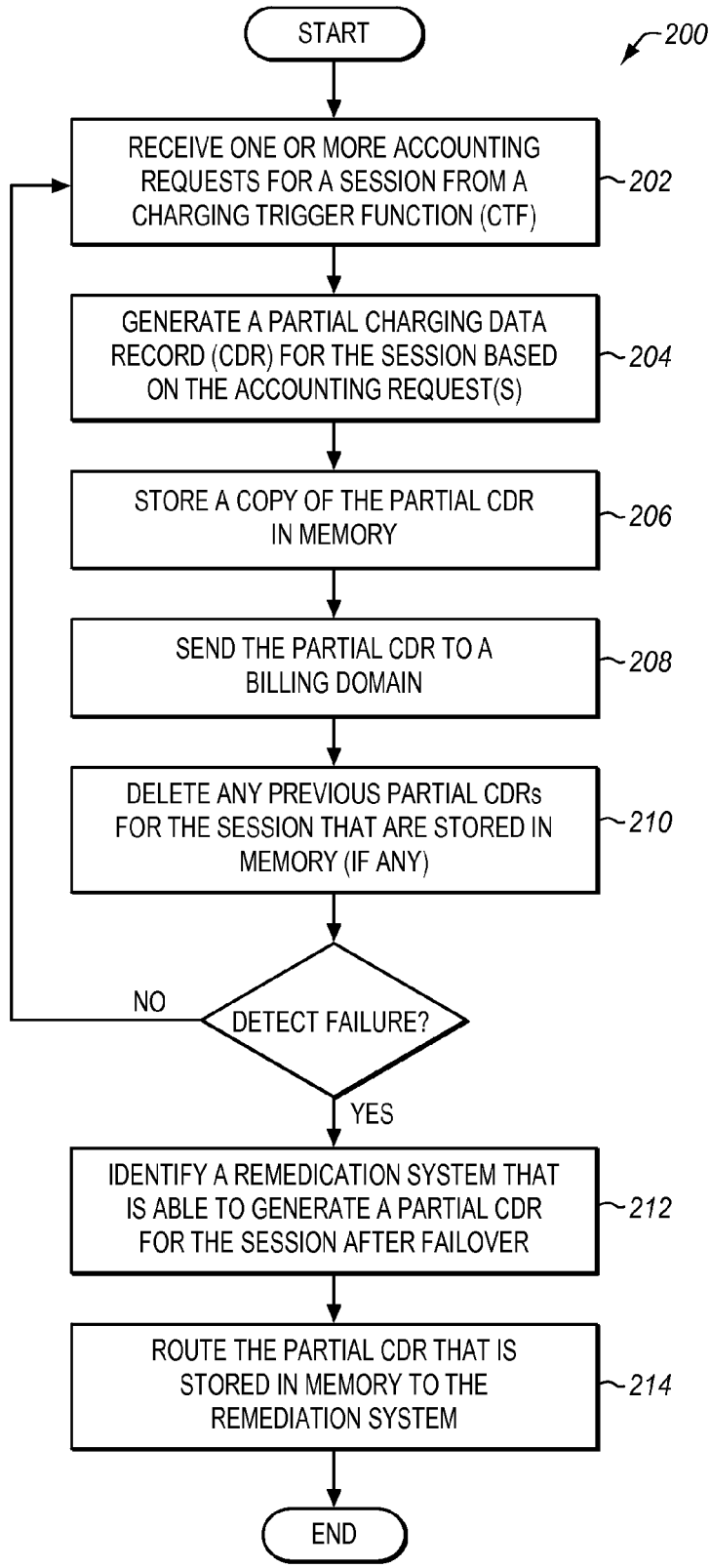

IDENTIFICATION OF TIMESTAMPS FOR A PARTIAL CDR WHEN FAILOVER OCCURS IN AN OFFLINE CHARGING SYSTEM

RELATED APPLICATIONS

This patent application is a divisional of co-pending U.S. non-provisional patent application Ser. No. 13/541,800, filed on Jul. 5, 2012, which is hereby incorporated by reference.

FIELD OF THE INVENTION

The invention is related to the field of communication systems and, in particular, to offline charging for sessions of a communication system.

BACKGROUND

Service providers typically provide numerous voice and data services to end users (also referred to as subscribers). Examples of voice services are voice calls, call forwarding, call waiting, etc. Examples of data services are streaming audio, streaming video, Voice over Internet Protocol (VoIP), online gaming, and IP-TV. The data services are managed by a packet core network, which interfaces the end user with external Packet Data Networks (PDN), such as the Internet.

The service providers use offline and online charging to keep track of the charges incurred by each device for accessing the various services. The 3GPP/3GPP2 standards groups have defined a set of specifications that may be used to implement online and offline charging in the various network domains (e.g., a circuit switching network domain, a packet switching network domain, and/or a wireless domain), IP Multimedia Subsystems (IMS), 3G/OMA application services, etc.

Offline charging is generally defined as a charging mechanism where charging information does not affect, in real-time, the service rendered. In offline charging, charging information for network resource usage is collected concurrently with resource usage. The network elements of an IMS network, for example, include Charging Trigger Functions (CTF). Some examples of the network elements that include CTFs are Call Session Control Functions (Proxy, Serving, and Interrogating) and application servers (AS). For offline charging, the CTF triggers on charging events, collects charging information pertaining to the charging events, and assembles the charging information into matching charging events. The CTF then reports the charging events to an Offline Charging System (OFCS) by sending accounting requests to the OFCS. One example of an accounting request is a Diameter Accounting Request (ACR).

The OFCS includes one or more Charging Collection Functions (CCF) that build Charging Data Records (CDR) using charging information for a session provided by the CTFs in the accounting requests. When the session ends, the CCF provides the CDR (or a single consolidated CDR) to a billing domain so that charges can be reconciled for the session.

To illustrate offline charging, when a network element first becomes involved in a session, the CTF in the network element generates an ACR[Start] and transmits the ACR [Start] to a primary CCF. After the session is established, the CTF periodically transmits one or more ACR[Interim] messages to the CCF. If the CTF detects that the session ends, then the CTF generates an ACR[Stop] and transmits the ACR[Stop] to the CCF.

When the primary CCF first receives the ACR[Start] from the CTF, the CCF opens a CDR for the session for that network element. The CCF then updates the open CDR each time it receives an ACR[Interim] from the CTF based on the charging information in the ACR[Interim]. If the primary CCF receives an ACR[Stop] from the CTF, then the CCF closes the CDR for the session for that network element.

There may be instances where the primary CCF generates a partial CDR for the session. The CCF has one or more triggers for closing a CDR. One of the triggers is a timer. For example, when CCF first receives an ACR[Start] from the CTF, the CCF sets a timer. If the CCF receives an ACR [Stop] from the CTF before expiration of the timer, then the CCF closes the CDR for the session to generate a full CDR. If the CCF does not receive an ACR[Stop] from the CTF before expiration of the timer, then the CCF closes the CDR to generate a partial CDR for the session. The CCF then opens a new CDR for the session. The CCF will continue to generate partial CDRs when the timer expires until an ACR[Stop] is received from the CTF.

If the primary CCF happens to encounter a failure while handling charging for a session, then the CTF within the network element will send the accounting requests to a secondary or backup CCF. This is referred to as a failover from a primary CCF to a secondary CCF. The secondary CCF will generate one or more CDRs for the session based on the charging information provided in the accounting requests. However, when there is a failover from one CCF to another, the information in the CDRs may be incomplete. Thus, the service provider may not be able to bill for part or all of a session.

SUMMARY

Embodiments described herein generate a partial CDR that includes the proper information to charge for a session even when a failure occurs involving a primary charging function (e.g., CCF) and charging transfers to a secondary charging function. One piece of information typically missing from a partial CDR that is generated after a failover is timestamps. If a partial CDR does not include a start timestamp and an end timestamp, then a billing domain cannot use the partial CDR to charge for the session. Therefore, the billing domain may discard the partial CDR, and the service provider will not be able to charge for a portion or all of the session. The embodiments described herein are able to determine a start timestamp and an end timestamp for a partial CDR that is generated after charging transfers from the primary charging function to the secondary charging function. This allows the billing domain to charge for the entire session even though charging was transferred between charging functions.

To determine the timestamps for a partial CDR that is generated after failover, the primary charging function buffers the most recent partial CDR for the session. Therefore, if primary charging function encounters a failure, the primary charging function is able to provide the most recent partial CDR to a remediation system upon recovery. When charging is transferred to a secondary charging function, the secondary charging function will receive an interim accounting request for the session from a CTF. The secondary charging function knows that there has been a failover (because it has no prior information about the session and the first accounting message for the session is an interim message), so the secondary charging function sends the interim accounting request to the remediation system. The remediation system will identify a "start" timestamp from the most recent partial CDR and will identify an "end" timestamp from the interim accounting request. The remediation system can then generate a partial CDR for the session using the start and end timestamps. This partial CDR can be used by a billing domain to charge for the session because it includes both a start timestamp and an end timestamp.

One embodiment comprises a remediation system that generates a partial CDR when charging for a session is transferred from a primary charging function to a secondary charging function due to a failure involving the primary charging function. The remediation system includes an interface configured to receive an interim accounting request for the session from the secondary charging function. The remediation system further includes a controller configured to open a new partial CDR for the session based on the interim accounting request. The interface is further configured to receive a prior partial CDR for the session from the primary charging function. The controller is further configured to parse the prior partial CDR to identify a CDR timestamp, and to record a start time in the new partial CDR based on the CDR timestamp. The controller is further configured to parse the interim accounting request to identify an accounting timestamp for the session, to record an end time in the new partial CDR based on the accounting timestamp, and to close the new partial CDR.

In another embodiment, the controller is further configured to transmit the new partial CDR to a billing domain.

In another embodiment, the prior partial CDR includes multiple timestamps, and the controller is further configured to select one of the multiple timestamps that is associated with closure of the prior partial CDR as the CDR closure timestamp.

In another embodiment, the prior partial CDR received from the primary charging function represents the most recent partial CDR generated for the session before the failure involving the primary charging function.

In another embodiment, the primary charging function and the secondary charging function comprise Charging Collection Functions (CCF).

In another embodiment, the interim accounting request comprises a Diameter request, and the controller is further configured to identify the accounting timestamp from the Event-Timestamp Attribute Value Pair (AVP) of the interim accounting request.

In another embodiment, the prior partial CDR includes at least one traffic data volume (TDV) container, and the controller is further configured to identify the CDR closure timestamp from the at least one TDV container in the prior partial CDR.

In another embodiment, the prior partial CDR includes at least one service data container (SDC), and the controller is further configured to identify the CDR closure timestamp from the at least one SDC container in the prior partial CDR.

Another embodiment comprises a method of generating a partial CDR for a session after failover. The method includes receiving an interim accounting request for the session from a secondary charging function, where charging for the session was transferred from a primary charging function to the secondary charging function due to a failure involving the primary charging function. The method further includes opening a new partial CDR for the session based on the interim accounting request. The method further includes receiving a prior partial CDR for the session from the primary charging function, parsing the prior partial CDR to identify a CDR timestamp for the session, and recording a start time in the new partial CDR based on the CDR timestamp. The method further includes parsing the interim accounting request to identify an accounting timestamp for the session, recording an end time in the new partial CDR based on the accounting timestamp, and closing the new partial CDR.

Another embodiment comprises a primary charging function configured to receive at least one accounting request for a session from a charging trigger function, and to generate a partial CDR for the session based on the at least one accounting request. The primary charging function is further configured to store the partial CDR in memory, to send a copy of the partial CDR to a billing domain, and to delete any previous partial CDRs for the session from memory so that the partial CDR in the memory represents the most recent partial CDR for the session.

In another embodiment, the primary charging function is further configured to detect a failure that causes the charging trigger function to send accounting requests to a secondary charging function instead of the primary charging function. The primary charging function is further configured to identify a remediation system that is able to generate a new partial CDR for the session after charging was transferred to the secondary charging function, and to route the stored partial CDR to the remediation system.

In another embodiment, the secondary charging function is configured to receive an interim accounting request from the charging trigger function, to determine that a failure occurred involving the primary charging function, to identify the remediation system that is able to generate the new partial CDR for the session after charging was transferred to the secondary charging function, and to route the interim accounting request to the remediation system.

In another embodiment, the remediation system comprises one of a cluster of Charging Collection Functions (CCF), and the primary charging function and the secondary charging function are configured to select the one CCF as the remediation system.

In another embodiment, the primary charging function and the secondary charging function are configured to apply a hash function to an identifier for the session to select the one CCF as the remediation system.

In another embodiment, the remediation system is configured to receive the interim accounting request for the session from the secondary charging function, and to open the new partial CDR for the session based on the interim accounting request. The remediation system is further configured to receive the stored partial CDR for the session from the primary charging function. The remediation system is further configured to parse the stored partial CDR to identify a CDR timestamp for the session, and to record a start time in the new partial CDR based on the CDR timestamp. The remediation system is further configured to parse the interim accounting request to identify an accounting timestamp for the session, to record an end time in the new partial CDR based on the accounting timestamp, and to close the new partial CDR.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 2 is a flow chart illustrating a method of operating a primary charging function in an exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1A:
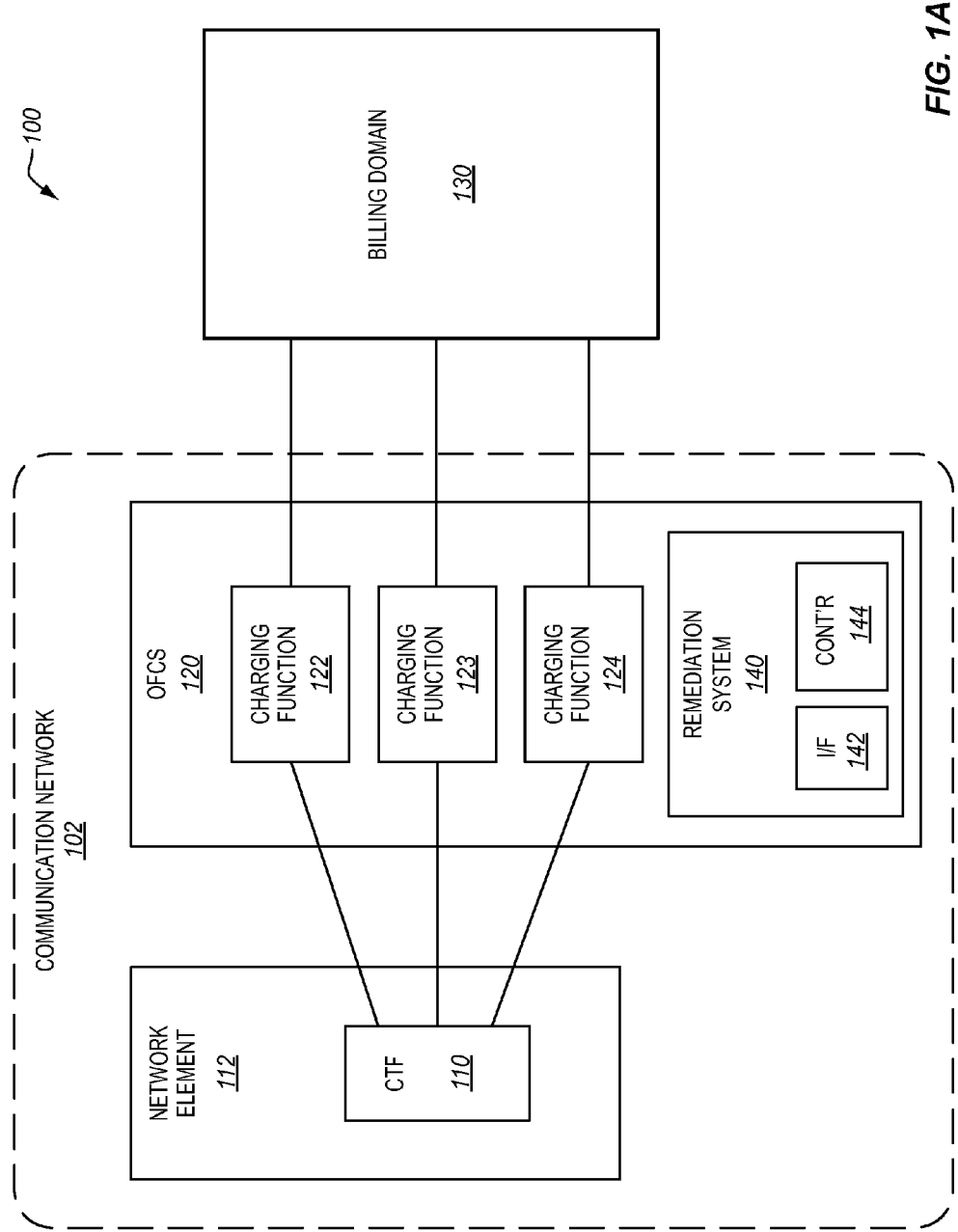
FIG. 1A illustrates an offline charging architecture for a communication network in an exemplary embodiment.

FIG. 1A illustrates an offline charging architecture 100 for a communication network in an exemplary embodiment. Architecture 100 illustrates a charging trigger function (CTF) 110 and an offline charging system (OFCS) 120 that are implemented by a network operator for a communication network 102. Architecture 100 also includes a billing domain 130. A CTF comprises any entity that generates charging events based on the observation of network resource usage. The CTF is the focal point for collecting information pertaining to chargeable events within a network element, assembling this information into matching charging events, and sending these charging events towards a charging function. A CTF is implemented in each network element or service element that provides charging information. Therefore, CTF 110 is illustrated in FIG. 1A as being part of network element 112. Network element 112 comprises any system, server, or function that serves a session within network 102. For example, in an IP Multimedia Subsystem (IMS) network, network element 112 may comprise a Serving-Call Session Control Function (S-CSCF), an Interrogating-Call Session Control Function (I-CSCF), a Media Gateway Control Function (MGCF), an application server (AS), etc. Equivalently, in LTE/EPC networks, network element 112 may comprise a PDN Gateway (PGW), a Serving Gateway (SGW), etc.

OFCS 120 provides offline charging for services provided in network 102. In this embodiment, OFCS 120 includes a plurality of charging functions 122-124. A charging function comprises any system, apparatus, or component that receives charging events from CTFs (such as through the Rf reference point), and uses the information contained in the charging events to construct Charging Data Records (CDRs). For example, charging function 122 may comprise a Charging Collection Function (CCF) as defined by the 3GPP in Release 5. Charging function 122 may alternatively comprise a Charging Data Function (CDF)/Charging Gateway Function (CGF) as defined by the 3GPP in Release 6 and subsequent releases.

Billing domain 130 comprises any system, server, or function that receives and processes CDRs from the charging functions, and provides mediation, billing, and/or other (e.g., statistical) end applications.

When CTF 110 sends charging events toward a charging function (such as charging function 122), the charging events are sent as "accounting requests". An accounting request comprises any offline charging message that includes information used to charge for a session. For instance, at the beginning of a session, CTF 110 may generate an initial accounting request, and transmit the initial accounting request to charging function 122. One example of an initial accounting request is a Diameter Rf Accounting Request (ACR)[Start]. During the session, CTF 110 may periodically generate interim accounting requests, and transmit the interim accounting requests to charging function 122. One example of an interim accounting request is a Diameter Rf ACR[Interim]. At the end of the session, CTF 110 may generate a stop accounting request, and transmit the stop accounting request to charging function 122. One example of a stop accounting request is a Diameter Rf ACR[Stop].

Charging function 122 is able to generate CDRs based on the accounting requests received from CTF 110. Upon receiving an accounting request, charging function 122 opens a CDR or adds information to an existing, open CDR. A CDR is opened upon an initial charging event specifying the start of a session. Therefore, when charging function 122 receives a start accounting request, charging function 122 opens a CDR for the session (for CTF 110 of network element 112). Information is added to the open CDR upon receiving interim charging events. Therefore, when charging function 122 receives interim accounting requests, charging function 122 updates the open CDR for the session based on information in the interim accounting requests. A CDR may be closed due to a number of reasons, such as a CDR time limit, a CDR volume limit, a change of charging conditions (e.g., a media change), an end of the session (e.g., receipt of a final charging event describing the session termination), etc. When a CDR is closed and the session is still active, this CDR is considered a partial CDR that provides charging information for part of a session. Also, when the CDR is closed, a subsequent CDR is opened. Thus, multiple partial CDRs may be needed to completely describe charging for the session.

There may be instances where the primary charging function for a session encounters a failure while charging for a session. For example, the primary charging function may have a hardware or software failure, the primary charging function may become overloaded with accounting requests, the communication link between the primary charging function and one or more CTFs may have a failure, etc. When a failure involving the primary charging function occurs, CTF 110 will identify a secondary charging function (e.g., charging function 123), and begin to send accounting requests to the secondary charging function. The secondary charging function will then start generating CDRs for the session based on the accounting requests. However, one or more partial CDRs generated by the secondary charging function may have incomplete charging information because charging was transferred from the primary charging function to the secondary charging function. In the embodiments described herein, when charging transfers from the primary charging function to the secondary charging function due to a failure, the partial CDR(s) generated immediately after the transfer will include complete charging information. More particularly, the partial CDR generated after failover will include the appropriate timestamps to allow billing domain 130 to charge for the session.

Figure 1B:
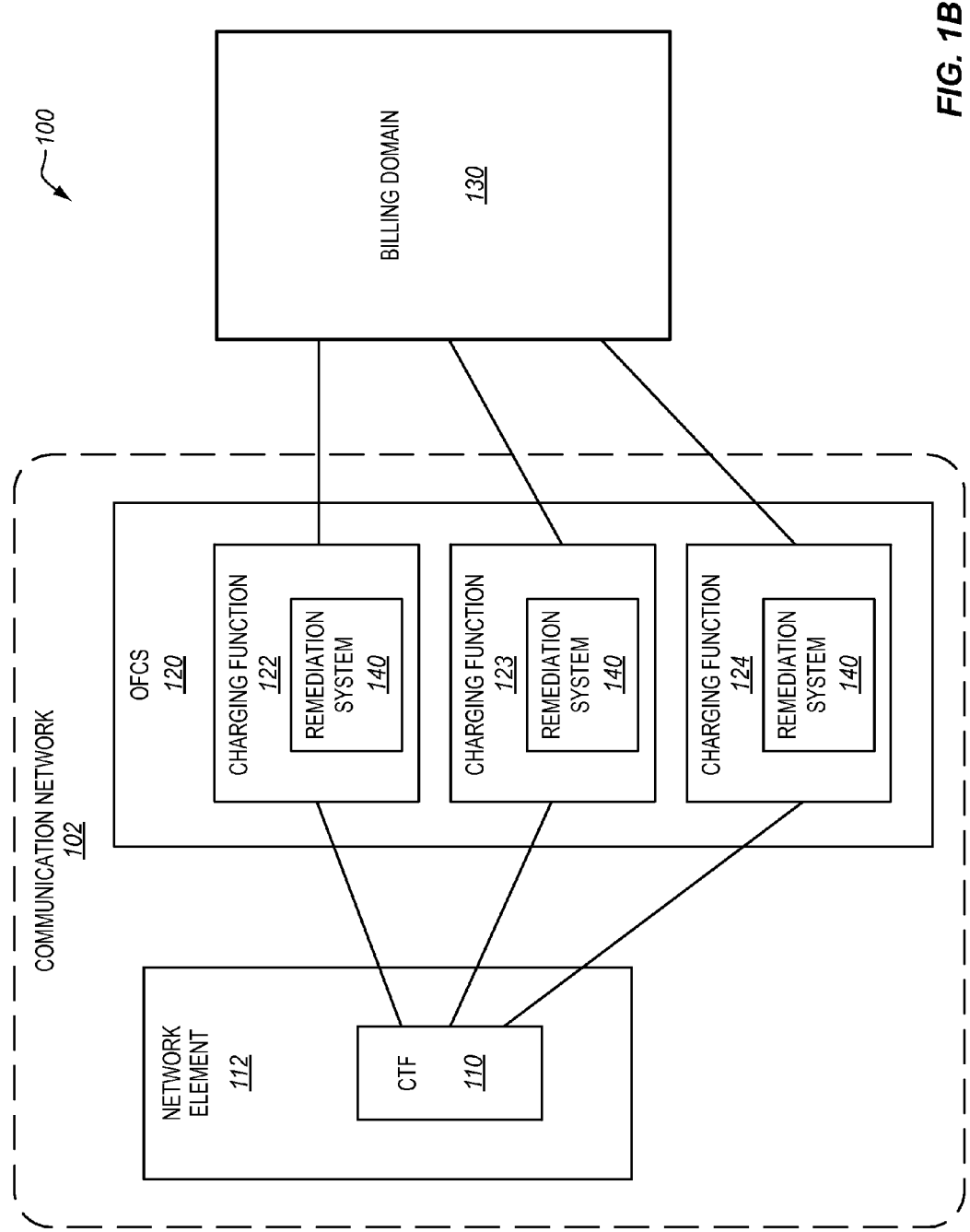
FIG. 1B illustrates another offline charging architecture for a communication network in an exemplary embodiment.

According the embodiments described below, architecture 100 further includes a remediation system 140. Remediation system 140 comprises any system, apparatus, or component that generates a partial CDR for a session when charging for the session is transferred from a primary charging function to a secondary charging function. Remediation system 140 includes an interface (I/F) 142 and a controller (CONT'R) 144. Interface 142 comprises any device or component that receives information from other charging functions or CTFs, such as partial CDRs or accounting requests. Controller 144 comprises any device or component that generates a partial CDR after the charging transfer, and inserts the appropriate timestamps in the partial CDR to allow for charging for the session. Remediation system 140 may comprise a separate system that is designated for handling failovers in architecture 100. Alternatively, remediation system 140 may represent or be part of a charging function, such as one or more of charging functions 122-124 illustrated in FIG. 1B, that is selected to handle failovers for a particular session.

In order for remediation system 140 to generate the partial CDR for the session, the primary charging function is enhanced to buffer the most recent partial CDR for the session, which is further illustrated in FIG. 2

FIG. 2 is a flow chart illustrating a method 200 of operating primary charging function 122 in an exemplary embodiment. The steps of method 200 will be described with reference to architecture 100 in FIG. 1A, but those skilled in the art will appreciate that method 200 may be performed in other systems. Also, the steps of the flow chart in FIG. 2 are not all inclusive and may include other steps not shown, and the steps may be performed in an alternative order.

One assumption for this method is that CTF 110 sends accounting requests for a session to primary charging function 122, such as an initial accounting request and one or more interim accounting requests. In step 202, primary charging function 122 receives the accounting requests from CTF 110. In step 204, primary charging function 122 generates a partial CDR for the session based on the accounting request(s). For example, when primary charging function 122 receives an initial accounting request, primary charging function 122 opens a CDR for the session (for CTF 110 of network element 112). If primary charging function 122 receives interim accounting requests, then primary charging function 122 updates the open CDR for the session based on information in the interim accounting requests. Upon some triggering condition, charging function 122 closes the CDR as a partial CDR (because the session is still active). After closing the partial CDR, primary charging function 122 stores a copy of the partial CDR in memory in step 206. Primary charging function 122 also sends the partial CDR to billing domain 130 in step 208.

The copy of the partial CDR stored in memory represents the most recent partial CDR generated by primary charging function 122 for the session. Primary charging function 122 also determines whether any previous partial CDRs are stored in memory for this session. If so, primary charging function 122 deletes the previous partial CDR(s) for the session from memory in step 210, as primary charging function 122 is programmed to store the most recent partial CDR generated for the session.

As primary charging function 122 is handling charging for the session by generating the partial CDRs, one assumption is that a failure occurs involving primary charging function 122. A failure involving primary charging function 122 comprises any internal malfunction to the charging function (e.g., a hardware failure or software failure) that puts charging function 122 out of service, or any type of crash involving a communication link between primary charging function 122 and CTF 110 than renders charging function 122 unreachable. When a failure occurs involving primary charging function 122, CTF 110 will be able to identify the failure. For example, CTF 110 may use a watchdog function (such as a Diameter DWR/DWA mechanism as provided in IETF RFC 3588) to monitor the status of primary charging function 122. CTF 110 may also determine if primary charging function 122 fails to respond to an accounting request with the appropriate accounting answer, and identify a failure if primary charging function 122 does not respond. Upon detecting the failure involving primary charging function 122, CTF 110 identifies routing information for secondary charging function 123. When CTF 110 generates another interim accounting request for the session, CTF 110 will forward the interim charging request to secondary charging function 123 instead of primary charging function 122. Secondary charging function 123 is also enhanced in the embodiments provided herein to send the interim charging request to remediation system 140, which is further illustrated in FIG. 3.

Figure 3:
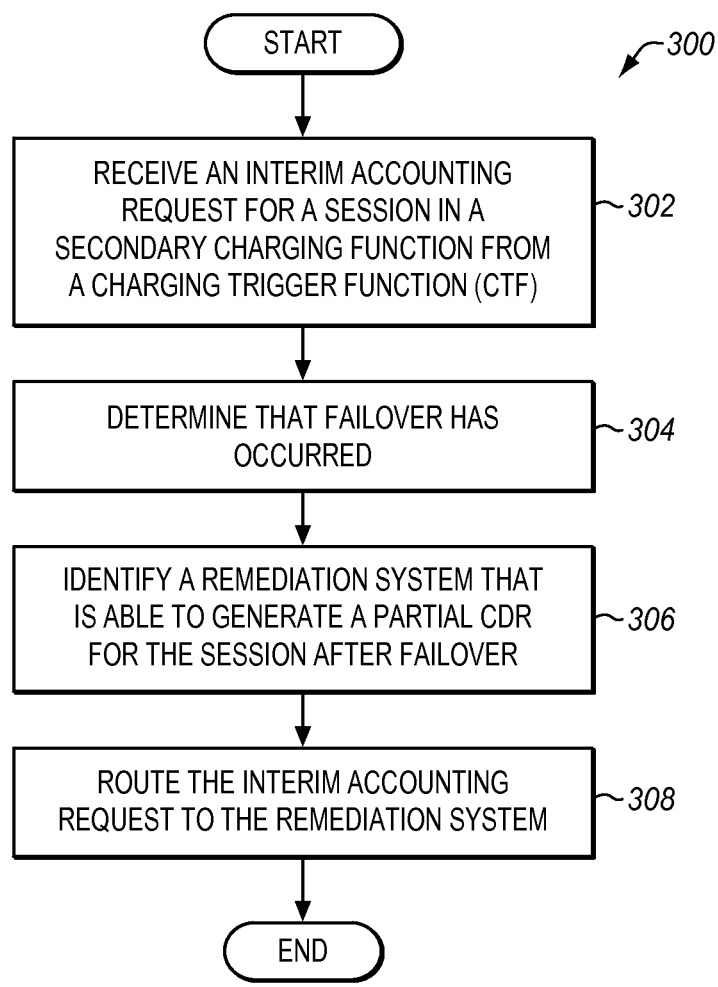
FIG. 3 is a flow chart illustrating a method of operating a secondary charging function during failover in an exemplary embodiment.

FIG. 3 is a flow chart illustrating a method 300 of operating secondary charging function 123 during failover in an exemplary embodiment. The steps of method 300 will be described with reference to architecture 100 in FIG. 1A, but those skilled in the art will appreciate that method 300 may be performed in other systems.

In step 302, secondary charging function 123 receives the interim accounting request from CTF 110. In step 304, secondary charging function 123 determines that failover has occurred regarding charging for the session. For example, secondary charging function 123 may determine that this accounting request is an "interim" message, but no prior accounting requests were received for the session, such as a start accounting request. Because no prior charging messages were received for the session, secondary charging function 123 is able to determine that failover has occurred.

In response to detecting failover, the internal logic in secondary charging function 123 is programmed to contact a remediation system that is able to generate the next partial CDR for the session after charging is handed over from the primary charging function to the secondary charging function. Thus, secondary charging function 123 identifies remediation system 140 in step 306. To do so, secondary charging function 123 may identify a static routing address for remediation system 140 if remediation system 140 is a stand-alone system designated to handle failover scenarios for all sessions. If remediation system 140 comprises one of the charging functions within a cluster of charging functions, then secondary charging function 123 may apply a hash function to an identifier for the session to identify the charging function that is designated to handle a failover for this particular session. Secondary charging function 123 then routes the interim accounting request to remediation system 140 in step 308.

The internal logic in primary charging function 122 is also programmed to contact a remediation system after charging is handed over to secondary charging function 123. In FIG. 2, primary charging function 122 identifies remediation system 140 in step 212. Primary charging function 122 may identify remediation system 140 in the same way that secondary charging function 123 identifies remediation system 140. Primary charging function 122 then routes the partial CDR that is being stored to remediation system 140 in step 214. The partial CDR that is stored in primary charging function 122 represents the most recent partial CDR generated for the session.

In the embodiments described herein, remediation system 140 is able to generate the first partial CDR for the session after failover (i.e., after charging has been handed over from the primary charging function to the secondary charging function). An exemplary operation of remediation system 140 is described in more detail in FIG. 4.

Figure 4:
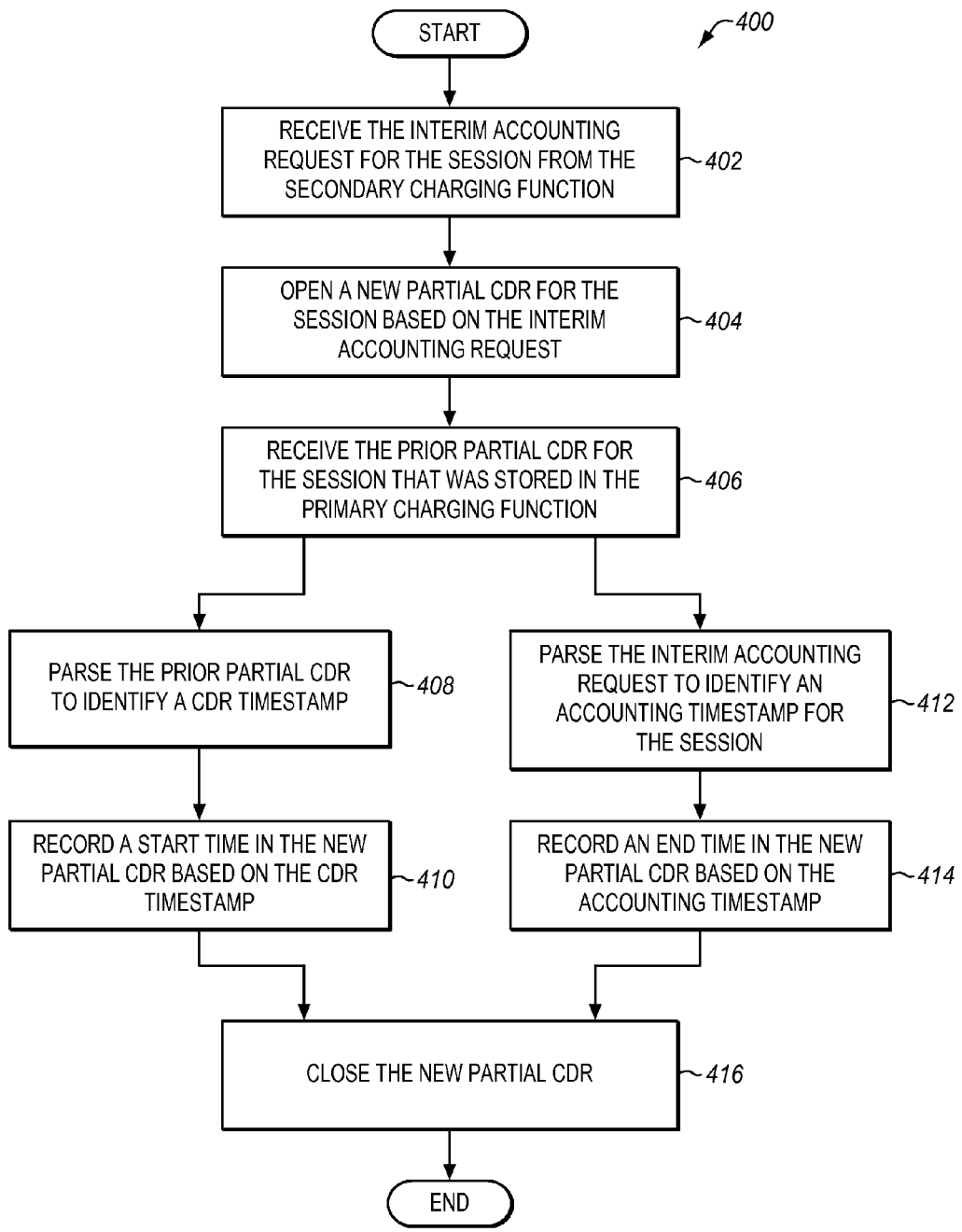
FIG. 4 is a flow chart illustrating a method of generating a partial CDR after failover in an exemplary embodiment.

FIG. 4 is a flow chart illustrating a method 400 of generating a partial CDR after failover in an exemplary embodiment. The steps of method 400 will be described with reference to architecture 100 in FIG. 1A, but those skilled in the art will appreciate that method 400 may be performed in other systems.

In step 402, interface 142 of remediation system 140 receives the interim accounting request for the session from secondary charging function 123. In step 404, controller 144 opens a new partial CDR for the session based on the interim accounting request. In step 406, interface 142 receives the prior partial CDR for the session that was stored in primary charging function 122.

In step 408, controller 144 parses the prior partial CDR to identify a timestamp for the session. Because the prior partial CDR was the most recent partial CDR for the session, the prior partial CDR will include one or more timestamps previously recorded for the session. Therefore, controller 144 can select one of the timestamps in the prior partial CDR as the start time for the new partial CDR. The timestamp selected from the prior partial CDR by controller 144 is referred to herein as a "CDR timestamp". In one particular embodiment, controller 144 will select the timestamp that is associated with the closure of the prior partial CDR as the CDR timestamp. Controller 144 then records the start time in the new partial CDR based on the CDR timestamp in step 410.

In step 412, controller 144 also parses the interim accounting request to identify a timestamp for the session. For example, if the interim accounting request is a Diameter request, then controller 144 may parse the Event-Timestamp Attribute Value Pair (AVP) of the interim accounting request to extract the timestamp from this AVP. The timestamp from the Event-Timestamp AVP can be used to close a container within a partial CDR. Therefore, controller 144 can select the timestamp from the interim accounting request as the end timestamp for the new partial CDR. The timestamp selected from the interim accounting request by controller 144 is referred to herein as an "accounting timestamp". Controller 144 then records the end time in the new partial CDR based on the accounting timestamp in step 414.

After inserting the timestamps as described above and inserting any other desired charging information, controller 144 closes the new partial CDR in step 416. Controller 144 may then route the new partial CDR to billing domain 130 (such as through the Bx reference point). Because the new partial CDR includes both a start timestamp and an end timestamp, billing domain 130 is able to charge for the portion of the session referenced by the new partial CDR.

CTF 110 will continue to send interim accounting requests for the session to secondary charging function 123. Secondary charging function 123 can then generate additional partial CDRs for the session in a normal fashion based on the interim accounting requests. This process will continue until the session ends.

As an overview, the above embodiments advantageously allow remediation system 140 to generate a partial CDR for the session that includes both a start timestamp and an end timestamp after charging transfers from a primary charging function to a secondary charging function. Because the partial CDR generated immediately after failover includes both timestamps, a network operator will be able to charge for the entire session. Thus, the network operator will not lose revenue when there is a failure involving one of its charging functions.

Example

Figure 5:
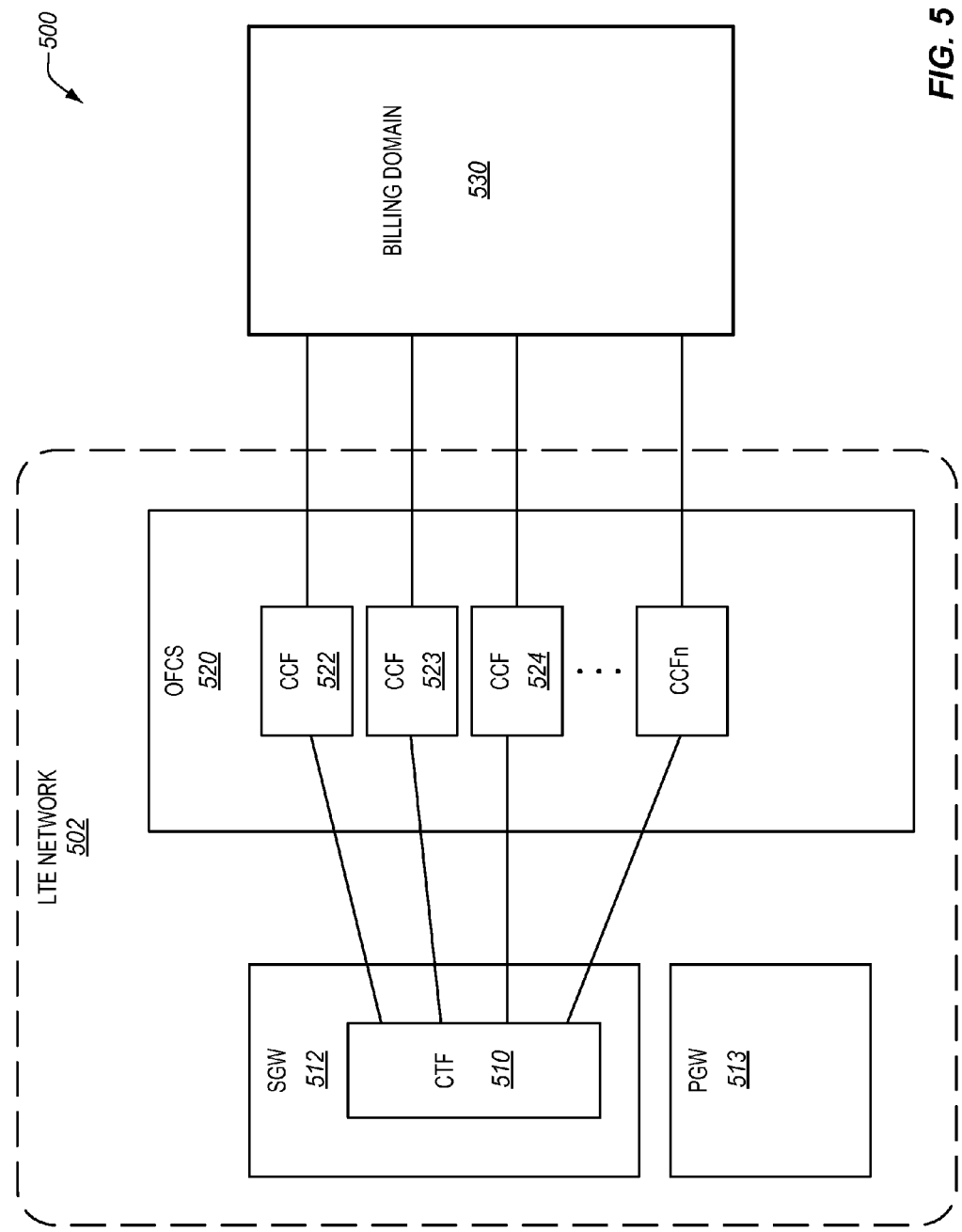
FIG. 5 illustrates an offline charging architecture for an LTE network in an exemplary embodiment.
Figure 6:
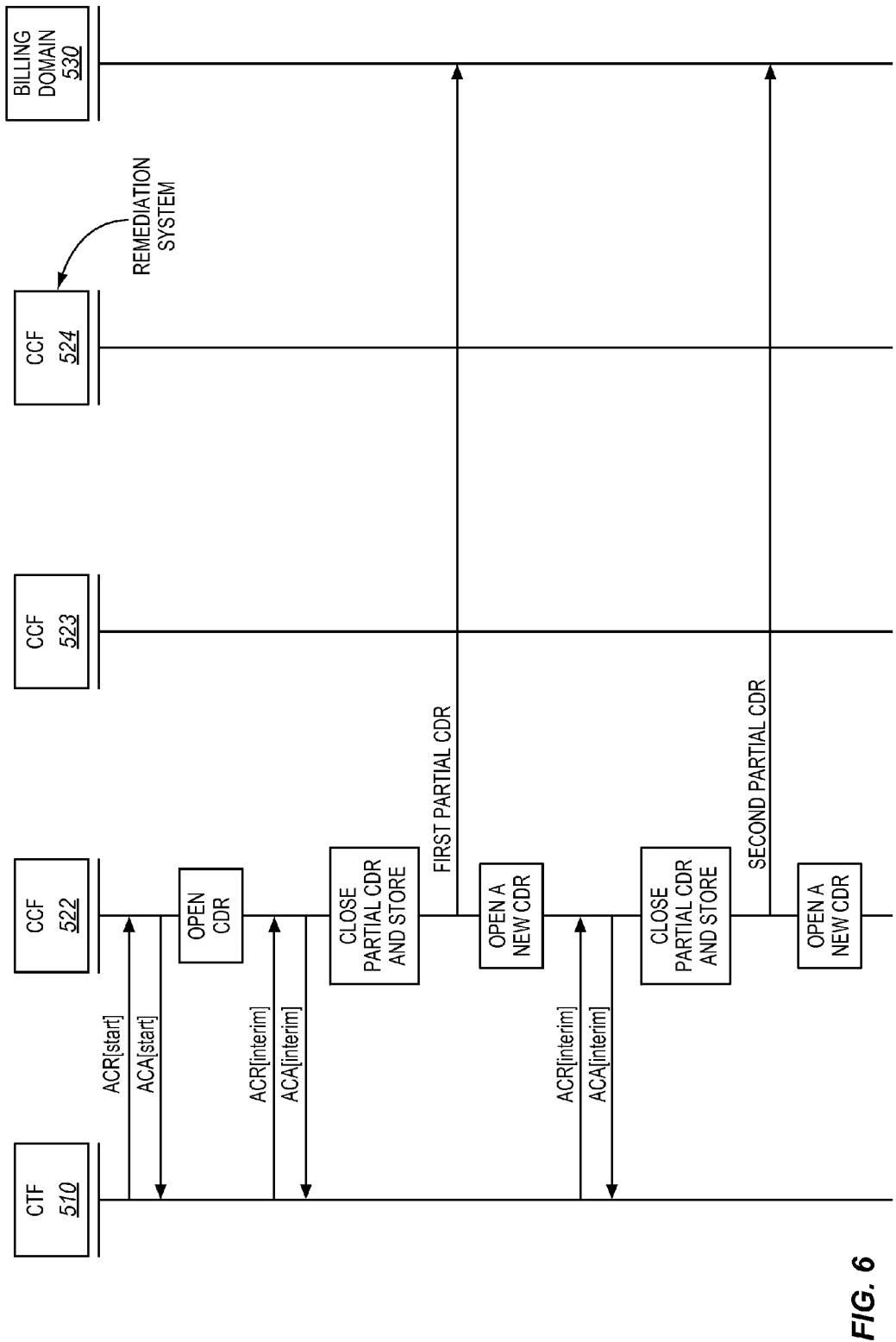
FIGS. 6-7 illustrate communications between elements to generate a partial CDR after failover in an exemplary embodiment.
Figure 7:
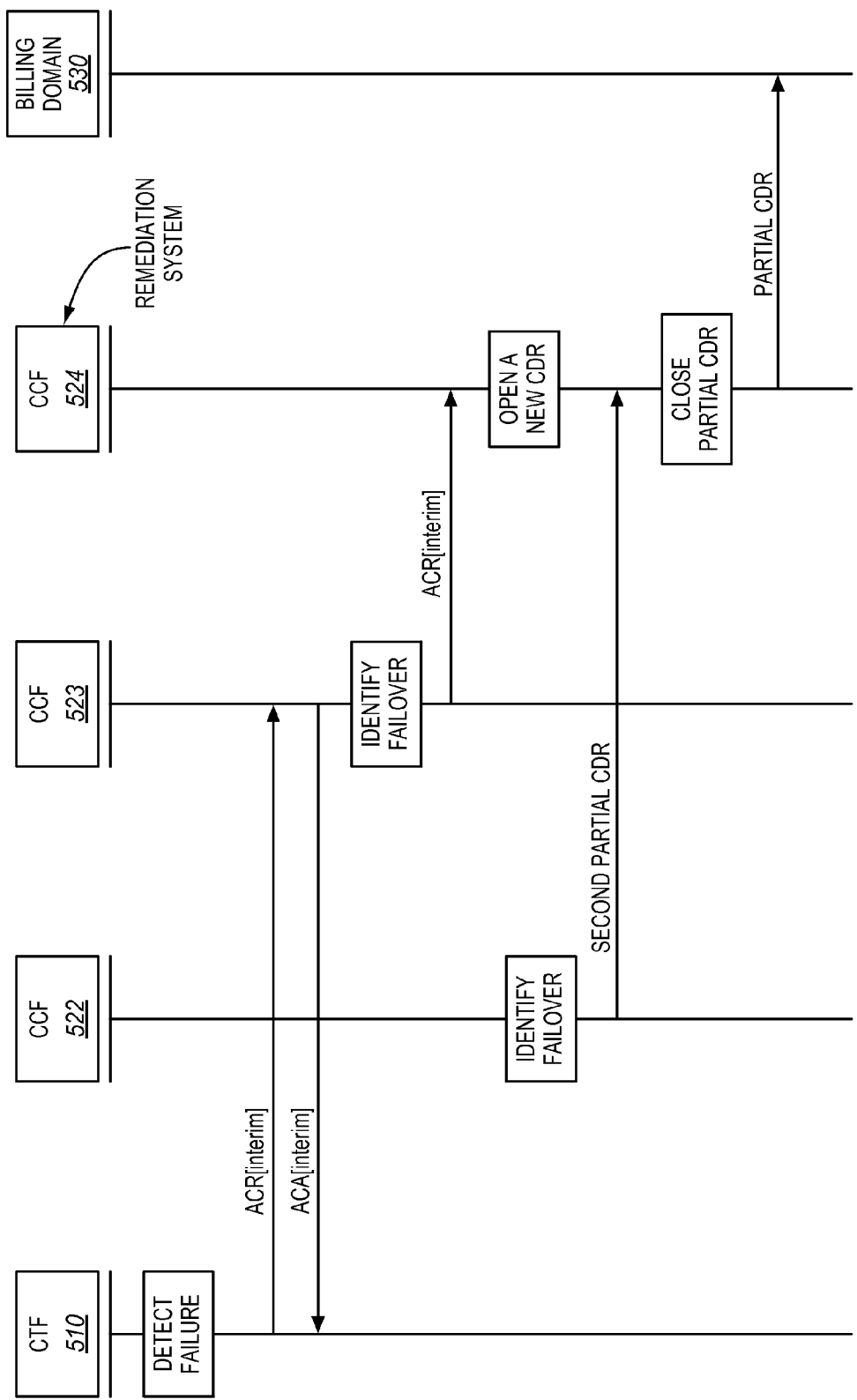

FIGS. 5-7 illustrate an example of failover in a Long Term Evolution (LTE) network. FIG. 5 illustrates an offline charging architecture 500 for an LTE network in an exemplary embodiment. An LTE network 502 includes a core network referred to as an Evolved Packet Core (EPC). The EPC includes a Serving Gateway (SGW) 512 that includes a Charging Trigger Function (CTF) 510. SGW 512 routes and forwards user data packets, and CTF 510 generates charging events for the services provided by SGW 512. The EPC may further includes a PDN Gateway (PGW) 513 that provides connectivity from User Equipment (UE) to external packet data networks. Although not specifically shown, PGW 513 will include a CTF much like SGW 512.

LTE network 502 also includes an offline charging system (OFCS) 520. In this example, OFCS 520 includes a cluster of Charging Collection Functions (CCF) 522-n. CCFs 522-n receive charging events from CTF 510 (such as through the Rf reference point), and use the information contained in the charging events to construct CDRs.

Architecture 500 further includes billing domain 530.

FIGS. 6-7 illustrate communications between elements to generate a partial CDR after failover in an exemplary embodiment. In FIG. 6, assume for this example that a session initiates within LTE network 502, and SGW 512 serves the session. When the session initiates, CTF 510 transmits a Diameter Rf ACR[Start] to the primary CCF, which is CCF 522. CCF 522 responds with a Diameter Accounting Answer (ACA)[Start]. In response to the ACR [Start], CCF 522 opens a CDR for the session. CCF 522 then populates the CDR with charging information from the ACR[Start].

As SGW 512 serves the session, CTF 510 will trigger on the next charging event. For the next charging event, CTF 510 generates a first ACR[Interim], and sends the first ACR[Interim] to CCF 522. CCF 522 responds with an ACA[Interim]. An ACR[Interim] from SGW 512 reports traffic data volume (TDV) to CCF 522. CCR 522 updates the open CDR with information from the ACR[Interim] on the TDV containers. For example, assume that the first ACR [Interim] reports three TDV containers, such as:

TDV-1: QoS information (optional), data volume uplink, data volume downlink, change condition=Volume Limit, Time Change=timestamp1 (TS1)

TDV-2: QoS information (optional), data volume uplink, data volume downlink, change condition=Time Limit, Time Change=timestamp2 (TS2)

TDV-3: QoS information (optional), data volume uplink, data volume downlink, change condition=UE TZ change, Time Change=timestamp3 (TS3).

If the CTF in PGW 513 were to trigger on charging events, the ACR[Interim] from PGW 513 would report service data containers (SDC) to CCF 522. Thus, the description herein regarding TDV containers from SGW 512 can be applied to SDC's from PGW 513.

In response to the ACR[Interim], CCF 522 may generate a partial CDR with the record opening timestamp being the timestamp of the record instantiation at CCF 522 upon receipt of the ACR[Start], and the record closure timestamp being extracted from the Event-Timestamp AVP (attribute-value-pair) sent with the ACR[Interim] that reports the 3 TDVs. Alternatively, CCF 522 may simply update counters in certain cases and not generate a partial CDR. For example, if the reporting limit at the gateways is set to a smaller value, there may be many ACR[Interim] messages generated by them as the session progresses, but the OFCS (CCF 522 in this case) may create a partial CDR for every $5^{th}$ ACR[Interim] if the volume limits so dictate. The internal logic of CCF 522 is programmed to store the most recent partial CDR generated by CCF 522. Therefore, CCF 522 may store the first partial CDR in non-volatile memory, or release the first partial CDR to billing domain 530 after making a copy of the first partial CDR in memory.

CCF 522 then opens a new CDR for the session. The start timestamp for this CDR is derived from the Event-Timestamp AVP received in the previous ACR[Interim]. Assume further that CTF 510 sends a second ACR[Interim] to CCF 522. CCF 522 responds with an ACA[Interim]. CCF 522 then updates the new CDR with charging information from the second ACR[Interim]. For instance, the second ACR[Interim] may report two TDV containers, such as:

TDV-4: QoS information (optional), data volume uplink, data volume downlink, change condition=Time Limit, Time Change=timestamp4 (TS4)

TDV-5: QoS information (optional), data volume uplink, data volume downlink, change condition=Volume Limit, Time Change=timestamp5 (TS5)

Following the same logic as before, CCF 522 may generate a second partial CDR, or may simply update internal counters in the CDR template, but not actually generate a second partial CDR. For the sake of simplicity, we assume that CCF 522 creates a second partial CDR. The second partial CDR generated by CCF 522 includes charging information on the two TDV containers from the second ACR[Interim]. Because the internal logic of CCF 522 is programmed to store the most recent partial CDR, CCF 522 may release the first partial CDR to billing domain 530, and store the second partial CDR in memory. If CCF 522 already sent the first partial CDR to billing domain 530, then CCF 522 overwrites the first partial CDR with a copy of the second partial CDR.

Assume now that CCF 522 experiences a failure and CTF 510 is no longer able to communicate with CCF 522. In FIG. 7, CTF 510 will failover to a secondary CCF, which is CCF 523 in this example. Therefore, CTF 510 sends a third ACR[Interim] for the session to CCF 523 instead of CCF 522.

When CCF 523 receives the third ACR[Interim], CCF 523 recognizes that it has not received a prior ACR for this session, and that it does not have any prior session information. CCF 523 also does not know which of the other CCFs (e.g., CCF 522) was previously handling the session. Therefore, CCF 523 does not open a CDR in response to this ACR. Instead, CCF 523 selects another CCF in the cluster to act as a remediation system to generate the partial CDR. To select the remediation system, CCF 523 may apply a hash function to an identifier for the session. Assume for this example that CCF 524 is selected as the remediation system. CCF 523 then forwards the third ACR[Interim] to CCF 524.

CCF 523 also anticipates receiving further accounting requests for the session (as the ACR was non-final, or an Interim type) and opens a CDR for the session, CCF 523 derives an opening time stamp from the Event-Timestamp AVP present in the ACR[Interim] received from CTF 510. Further messages received for this accounting session would be treated normally at CCF 523, since both the start and end timestamps would be available for extraction locally. Therefore, the rest of the session in this example can be treated normally. It is noted that a second failure in the session accounting may happen, where CCF 523 may fail as well. In that eventuality, CCF 523 may operate as does CCF 522 in response to a failover, such as to store the most recent partial CDR.

Assume now that CCF 522 recovers from its failure. As part of the recovery, the internal logic in CCF 522 is programmed to provide its most recent partial CDR for the session to a remediation system. Thus, CCF 522 identifies the second partial CDR stored in memory, which represents the most recent partial CDR generated by CCF 522 for the session. CCF 522 then selects another CCF in the cluster to act as a remediation system. CCF 522 selects the remediation system in the same manner as CCF 523, so CCF 522 applies a hash function to the session identifier, which will yield a result pointing to CCF 524 as the remediation system. CCF 522 then sends the second partial CDR for the session to CCF 524.

CCF 524 therefore receives the third ACR[Interim] for the session from CCF 523 and receives the second partial CDR for the session from CCF 522. In response to the third ACR[Interim], CCF 524 opens a third partial CDR for the session. CCF 524 also parses the TDV containers for the session from the second partial CDR, and extracts the timestamp information from the TDV containers; as each TDV container carries information on Data Volume Uplink, Data Volume Downlink, Change Condition and Change Time. In this example, TS4 and TS5 are taken into account and compared. The later of the two timestamps from the second partial CDR is selected as the closest possible value to the start time for the third partial CDR. CCF 524 then records the selected timestamp as the start time for the third partial CDR.

CCF 524 also extracts the Event-Timestamp AVP from the third ACR[Interim] to identify an end of record timestamp. CCF 524 then records the timestamp from the third ACR[Interim] as the end time for the third partial CDR. After CCF 524 enters any other desired information, CCF 524 closes the third partial CDR and sends the third partial CDR to billing domain 530. Because the third partial CDR includes both a start timestamp and an end timestamp, billing domain 530 is able to charge to the entire session even though a failover occurred.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. An Offline Charging System (OFCS) comprising:
a primary charging function including a processor configured to receive at least one accounting request for a session from a charging trigger function, and to generate a partial Charging Data Record (CDR) for the session based on the at least one accounting request;
while the session is still active, the primary charging function is configured to store the partial CDR in memory, to send a copy of the partial CDR to a billing domain, and to delete any previous partial CDRs for the session from memory so that the partial CDR in memory represents the most recent partial CDR for the session;
the primary charging function is configured to detect a failure that causes the charging trigger function to send accounting requests to a secondary charging function instead of the primary charging function; and
the primary charging function is configured to identify a remediation system that is able to generate a next partial CDR for the session after charging was handed over to the secondary charging function, and to route the stored partial CDR to the remediation system.

2. The OFCS of claim 1 wherein:
the secondary charging function is configured to receive an interim accounting request from the charging trigger function, to determine that charging was handed over from the primary charging function to the secondary charging function, to identify the remediation system that is able to generate the next partial CDR for the session after charging was handed over to the secondary charging function, and to route the interim accounting request to the remediation system.

3. The OFCS of claim 2 wherein:
the remediation system comprises one of a cluster of Charging Collection Functions (CCF); and
the primary charging function and the secondary charging function are configured to select the one CCF as the remediation system.

4. The OFCS of claim 3 wherein:
the primary charging function and the secondary charging function are configured to apply a hash function to an identifier for the session to select the one CCF as the remediation system.

5. The OFCS of claim 2 wherein:
the remediation system is configured to receive the interim accounting request for the session from the secondary charging function, to open the next partial CDR for the session based on the interim accounting request, to parse the interim accounting request to identify an accounting timestamp for the session, and to record an end time in the next partial CDR based on the accounting timestamp.

6. The OFCS of claim 5 wherein:
the interim accounting request comprises a Diameter request; and
the remediation system is configured to identify the accounting timestamp from the Event-Timestamp Attribute Value Pair (AVP) of the interim accounting request.

7. The OFCS of claim 5 wherein:
the remediation system is configured to receive the stored partial CDR for the session from the primary charging function, to parse the stored partial CDR to identify a CDR timestamp, and to record a start time in the next partial CDR based on the CDR timestamp.

8. The OFCS of claim 7 wherein:
the stored partial CDR includes at least one traffic data volume (TDV) container; and
the remediation system is configured to identify the CDR timestamp from the at least one TDV container in the stored partial CDR.

9. The OFCS of claim 7 wherein:
the stored partial CDR includes at least one service data container (SDC); and
the remediation system is configured to identify the CDR timestamp from the at least one SDC container in the stored partial CDR.

10. A method operable in an Offline Charging System (OFCS), the method comprising:
receiving at least one accounting request for a session in a primary charging function of the OFCS from a charging trigger function;
generating a partial Charging Data Record (CDR) for the session at the primary charging function based on the at least one accounting request;
while the session is still active:
storing the partial CDR in memory at the primary charging function;
sending a copy of the partial CDR from the primary charging function to a billing domain; and
deleting any previous partial CDRs for the session from memory at the primary charging function so that the partial CDR in memory represents the most recent partial CDR for the session;
detecting a failure that causes the charging trigger function to send accounting requests to a secondary charging function instead of the primary charging function;
identifying a remediation system that is able to generate a next partial CDR for the session after charging was handed over to the secondary charging function; and
routing the stored partial CDR from the primary charging function to the remediation system.

11. The method of claim 10 further comprising:
receiving an interim accounting request from the charging trigger function at the secondary charging function;
determining that charging was handed over from the primary charging function to the secondary charging function;
identifying the remediation system that is able to generate the next partial CDR for the session after charging was handed over to the secondary charging function; and
routing the interim accounting request from the secondary charging function to the remediation system.

12. The method of claim 11 wherein the remediation system comprises one of a cluster of Charging Collection Functions (CCF), the method further comprising:

selecting the one CCF as the remediation system at the primary charging function and the secondary charging function.

13. The method of claim 12 further comprising:
applying a hash function to an identifier for the session to select the one CCF as the remediation system.

14. The method of claim 11 further comprising:
receiving the interim accounting request for the session at the remediation system from the secondary charging function;
opening the next partial CDR for the session based on the interim accounting request;
parsing the interim accounting request to identify an accounting timestamp for the session; and
recording an end time in the next partial CDR based on the accounting timestamp.

15. The method of claim 14 wherein:
the interim accounting request comprises a Diameter request; and
the method includes identifying the accounting timestamp from the Event-Timestamp Attribute Value Pair (AVP) of the interim accounting request.

16. The method of claim 14 further comprising:
receiving the stored partial CDR for the session at the remediation system from the primary charging function;
parsing the stored partial CDR to identify a CDR timestamp; and
recording a start time in the next partial CDR based on the CDR timestamp.

17. The method of claim 16 wherein:
the stored partial CDR includes at least one traffic data volume (TDV) container; and
the method includes identifying the CDR timestamp from the at least one TDV container in the stored partial CDR.

18. The method of claim 16 wherein:
the stored partial CDR includes at least one service data container (SDC); and
the method includes identifying the CDR timestamp from the at least one SDC container in the stored partial CDR.

* * * * *